Patented May 20, 1952

2,597,201

UNITED STATES PATENT OFFICE 2,597,201

ADHESIVE LIQUID COMPOSITIONS SUITABLE FOR ELECTROSTATIC DUST PRECIPITATORS

Jack Swiss, Murrysville, and George W. Hewitt, Pittsburgh, Pa., assignors to Westinghouse Electric Corporation, East Pittsburgh, Pa., a corporation of Pennsylvania No Drawing. Application November 14, 1949, Serial No. 127,246

2 Claims. (Cl. 252—88)

This invention relates to adhesive liquid compositions particularly suited for application in dust precipitators wherein a readily water-washable, particle-adherent coating is desired.

There are a number of important requirements that must be met by a satisfactory adhesive for use in precipitators. The adhesive is applied to the dust-collecting plates of the precipitator so that when an air stream bearing dust particles that have been previously electrically charged with a charge opposite to that possessed by plates, passes over the plates, the dust particles will be attracted to the plates and will be held by the adhesive after the charge on the particles has been neutralized and an opposite charge given the particles. Inasmuch as a continual current of air is blown over the plates, the adhesive must have a low volatility; otherwise, it will be rapidly dissipated. Furthermore, the adhesive must be odorless, since even a slight degree of odor imparted to the passing air stream will be quite noticeable. The vapors from the adhesive must be non-toxic. Inasmuch as the adhesive is applied to substantially all the surfaces of the precipitator, it must have good electrically insulating characteristics since very high voltages are present. The adhesive should also be capable of thoroughly wetting the plates and the precipitated dust. Since the adhesive will accumulate dirt with use, eventually a point will be reached at which it will be so loaded that it will not have sufficient adhesive for additional dirt. When loaded with dirt, it must be readily washable, preferably with cold water, so that it may be removed from the plates which are closely spaced. The spaces between the electrostatic precipitator plates, for example, are less than half an inch; and, consequently, the adhesive, with its entrapped dust, should be readily washed away when a stream of water flows over it. Other desirable characteristics of such adhesives will be mentioned hereinafter.

While a number of liquids, particularly modified oils, have been suggested as dust-collecting adhesives for precipitator plates, coatings of such liquids, while easily washable with water when freshly applied to plates, after a week of use these liquids were found to be relatively unwashable with water and are so adherent to the plates that heavy deposits accumulate. Consequently, such proposed liquids are not suitable for this purpose.

The object of this invention is to provide a water-washable adhesive that possesses all of the properties above mentioned.

A further object of the invention is to provide for a water-soluble adhesive comprising a major proportion of an oily hydrocarbon and a minor proportion of a mixture of non-ionic surface active agents, one of which is relatively oil-soluble and the other of which is relatively water-soluble.

Other objects of the invention will in part be obvious and will in part appear hereinafter.

A highly satisfactory adhesive liquid composition for coating the dust-collecting parts of electrostatic precipitators and the like comprises essentially from 60% to 95% by weight of an oil of a viscosity of from 1000 to 5 centistokes and from 40% to 5% by weight of a mixture of non-ionic surface active agents, at least one of the agents being readily soluble in the oil and at least 2% comprising another surface active agent relatively insoluble in the oil, and at least the latter being soluble in water, with all the surface active agents being mutually soluble, the amount of the oil-soluble agents not less than the amount of the oil-insoluble, water-soluble agents. It will be appreciated that the terms "oil-insoluble" and "water-insoluble" as used refer to substantial amounts and not the solubility of traces.

Suitable oils for the practice of the invention are lubricating and machine oils with a viscosity of 1000 to 5 centistokes at 25° C. The oils may comprise paraffinic or aromatic petroleum fractions or mixtures thereof. In some cases long chain aliphatic esters, such, for example, as dioctyl sebacate and the like having from 15 to 36 carbon atoms in a long chain, may replace all or a part of the oil. The oils may include additives such as viscosity modifiers and freezing point depressants. Examples of suitable additives are partially hydrogenated terphenyl, such as ortho, meta or para decahydroterphenyl or mixtures of these isomers, and polyisobutylene. Up to 5% to 10% by weight of the oil may comprise such additives. Particularly good results have been secured with petroleum oils having viscosity of from 40 to 100 centistokes at 25° C. Oils of a higher or lower viscosity may be employed, depending upon the requirements and the temperatures to be met in service. Thus, a light or low viscosity oil, i. e., below 40 centistokes, should be employed where extremely cold air is to be treated in a dust precipitator; and, conversely, if highly heated air is to be passed through a dust precipitator, the use of an oil of the higher viscosity of up to 1000 centistokes is indicated.

From our experience we have found no single, non-ionic surface active agent that is satisfactory when added to oil for producing the desirable adhesive compositions of this invention. Accordingly, we find that it is necessary to employ a relatively water-soluble, non-ionic surface active agent in order to impart to the oil a sufficient degree of water washability, and to this end, for each 60 to 95 parts of oil there must be present at least 2 parts of the water-soluble surface active agent. In order to combine with and hold the water-soluble surface active agent distributed in the oil, it has been found necessary to use a second mutually soluble, relatively oil-soluble surface active agent in association therewith. From experience we find that the amount of the oil-insoluble surface active agent must not be less than that of the water-soluble surface active agent. Particularly good results have been secured when the oil-soluble surface active agent is from 2 to 4 times that of the oil-insoluble but water-soluble surface active agent. Obviously, a plurality of oil-soluble agents may be associated with a plurality of oil-insoluble but water-soluble surface active agents.

Optimum adhesives are secured when at least 6% of the adhesive composition is the non-ionic water-soluble, oil-insoluble agent and at least 12% is the oil-soluble non-ionic agent, and the balance, up to 82%, being the oil. Compositions in this range are stable in storage and are excellent adhesives.

The degree of the relative water and oil-solubility of the several agents may vary.

We have secured good results with the non-ionic surface active agents selected from the group of polyoxyalkylene hexose derivatives of monoacid esters of long chain acids of at least 14 carbon atoms. Particularly good results are obtained with polyoxyethylene sorbitan esters of at least one acid selected from the group consisting of oleic, palmitic, stearic lauric acids and resin acids. Polyoxypropylene-ethylene sorbitan esters of these acids are also effective. By proportioning the number and length of the polyalkylene oxide side chains in these esters, the agents may be rendered oil-soluble or water-soluble as desired. These agents may be prepared by reacting hexose derivatives, such as hexitans and hexides, with oleic, palmitic, stearic or lauric acid to form monoesters and then further reacting the monoesters with ethylene oxide, propylene oxide or mixtures of the oxides. Typical preparation of these compounds is described in United States Patent 2,380,166. The viscosity of these surface active agents will vary from 200 to 650 centipoises and higher.

The following examples are specific to various adhesive compositions that have been found highly satisfactory:

*Example I*

A mixture was prepared by thoroughly stirring together 75 parts by weight of petroleum oil of a viscosity of approximately 40 centistokes at 100° F.
18¾ parts by weight of a polyoxyethylene sorbitan monooleate that is relatively oil-soluble and has a viscosity of between 350 and 550 centipoises at 25° C., and
6¼ parts by weight of a polyoxyethylene sorbitan monooleate that is water-soluble and relatively oil-insoluble.

The mixture was readily stirred into a homogeneous, uniform liquid that could be sprayed or applied by dipping, to the parts of electrostatic precipitators. A coating of the composition adhered well to the metal and after the precipitator had been employed in continuous service for a week it was washed and a second coating of the adhesive applied. In comparative tests the precipitator plates may be washed weekly and a fresh coating of the adhesive reapplied over long periods of time without any appreciable build-up of a water-insoluble film or residue on the plates. The adhesive was found to be effective in holding the dust particles on the plates. No separation or other undesirable effects were found over a wide range of temperatures and air flow conditions. The composition was odorless, non-toxic and fully met all of the requirements previously set forth for a suitable adhesive composition for the purpose of the invention.

*Example II*

A mixture was prepared by stirring together:

75 parts by weight of the oil of Example I,
18.7 parts by weight of a polyoxyethylene sorbitan monooleate that was relatively soluble in the oil, and
6.3 parts by weight of a polyoxyethylene sorbitol ester of a mixture of acids which is water-soluble but not oil-miscible and is soluble in the mixture.

A homogeneous adhesive composition was produced. Tests of this adhesive composition indicated that it had excellent characteristics for the purpose of this invention. Dirt-laden coatings of the composition were particularly readily removed by flowing of water over the plates to which it was applied.

Polyoxyethylene ethers of long chain fatty acids having more than 12 carbon atoms in a chain have been employed as the oil-soluble component of the mixture of non-ionic surface active agents. Polyoxyethylene ether of oleic, palmitic and lauric acid are examples.

*Example III*

An example of a composition containing agents of this type comprised:

68½% of a light oil of a viscosity of 35 centistokes,
4½% of a polyoxyethylene ether of oleic acid,
18% by weight of an oil soluble polyoxyethylene sorbitan monooleate, and
9% of a polyglycol having a molecular weight of 6000.

This composition gave excellent results when applied to precipitator plates.

*Example IV*

A composition was prepared by combining:

80% of a lubricating oil having a viscosity of 45 centistokes,
10 parts of a water-soluble and oil-insoluble polyoxyethylene sorbitan monooleate, and
10 parts by weight of an oil-soluble sorbitan monolaurate.

The composition formed a homogeneous adhesive which when applied to electrostatic plates and tested for a long period of time gave excellent washability with almost negligible film left on the precipitator plates and satisfactorily met the requirements previously set forth as desirable in a satisfactory adhesive.

Example V 92.5 parts by weight of a petroleum oil of a viscosity 100 centistokes at 70° F.,
2 parts by weight of a water-soluble polyoxyethylene sorbitan monooleate,
5½ parts by weight of an oil-soluble polyoxyethylene sorbitan monooleate.

The mixture was readily stirred into a homogeneous liquid that was suitable for use as a dust retaining adhesive and dirt laden coatings thereof could be readily removed by washing with water.

Since certain changes in carrying out the above process and certain modifications in the composition which embodies the invention may be made without departing from its scope, it is intended that all matter contained in the above description shall be interpreted as illustrative and not in a limiting sense.

We claim as our invention:

1. A homogeneous liquid composition suitable for use as a readily water washable particle-adherent coating in dust precipitators, comprising as its essential ingredients from 60 to 95 parts by weight of a hydrocarbon oil of a viscosity of from 1000 to 5 centistokes and from 40 to 5 parts by weight of a mixture of non-ionic surface active agents, the agents being selected from the polyoxyalkylene sorbitan monoacid esters of acids selected from the group consisting of oleic, palmitic, stearic and lauric acids, at least one of the agents being readily soluble in the oil and at least 2 parts comprising another agent relatively insoluble in the oil, but at least the latter being relatively soluble in water, the surface active agents being mutually soluble, the amount of oil-soluble agent being not less than the amount of the oil-insoluble agent.

2. A homogeneous liquid composition for use as a readily water washable particle-adherent coating in dust precipitators, comprising as its essential ingredients from 65 to 82 parts by weight of a hydrocarbon oil of a viscosity of from 40 to 100 centistokes and from 35 to 18 parts by weight of a mixture of non-ionic surface active agents, the agents being selected form the polyoxyalkylene sorbitan monoacid esters of acids selected from the group consisting of oleic, palmitic, stearic and lauric acids, at least 12 parts comprising one of the agents being readily soluble in the oil and at least 6 parts comprising another agent relatively insoluble in the oil and the latter agent being relatively soluble in water, the surface active agents being mutually soluble, the amount of oil-soluble agent being from 2 to 4 times the weight of the water-soluble agent.

JACK SWISS.
GEORGE W. HEWITT.

REFERENCES CITED

The following references are of record in the file of this patent:

UNITED STATES PATENTS

| Number | Name | Date |
|---|---|---|
| 2,443,766 | Hedberg | June 22, 1948 |
| 2,470,537 | Waugh | May 17, 1949 |
| 2,538,199 | Jefferson et al. | Jan. 16, 1951 |

OTHER REFERENCES

Chemical Formulary, Bennett, Chem. Pub. Co., N. Y., Vol. 8, 1948, page 354.